US008587530B2

(12) United States Patent  (10) Patent No.: US 8,587,530 B2
Morimoto et al.  (45) Date of Patent: Nov. 19, 2013

(54) INFORMATION PROCESSING APPARATUS, INFORMATION PROCESSING METHOD, INFORMATION PROCESSING PROGRAM, AND MOBILE TERMINAL

(75) Inventors: Yukako Morimoto, Chiba (JP); Osamu Harada, Kanagawa (JP)

(73) Assignees: Sony Corporation, Tokyo (JP); Sony Mobile Communications, Inc., Tokyo (JP)

( * ) Notice: Subject to any disclaimer, the term of this patent is extended or adjusted under 35 U.S.C. 154(b) by 805 days.

(21) Appl. No.: 12/464,154

(22) Filed: May 12, 2009

(65) Prior Publication Data

US 2009/0284463 A1 Nov. 19, 2009

(30) Foreign Application Priority Data

May 13, 2008 (JP) .............................. P2008-126540

(51) Int. Cl.
 *G06F 3/041* (2006.01)
(52) U.S. Cl.
 USPC ......................................... 345/173; 345/156
(58) Field of Classification Search
 USPC ................................................. 345/156, 173
 See application file for complete search history.

(56) References Cited

U.S. PATENT DOCUMENTS

| 6,369,794 | B1* | 4/2002 | Sakurai et al. ................. 345/156 |
| 2003/0142081 | A1* | 7/2003 | Iizuka et al. .................. 345/173 |
| 2004/0169674 | A1 | 9/2004 | Linjama |
| 2006/0221051 | A1 | 10/2006 | Flynt et al. |
| 2007/0013659 | A1* | 1/2007 | Nagata et al. ................. 345/158 |
| 2007/0247434 | A1* | 10/2007 | Cradick et al. ................ 345/173 |
| 2007/0257097 | A1 | 11/2007 | Nurmela |
| 2007/0257881 | A1 | 11/2007 | Nurmela et al. |
| 2008/0184797 | A1 | 8/2008 | Kawaguchi |
| 2008/0186169 | A1 | 8/2008 | Kawaguchi |

FOREIGN PATENT DOCUMENTS

| JP | 2002-368841 | 12/2002 |
| JP | 2006-285966 | 10/2006 |
| JP | 2006 333355 | 12/2006 |
| JP | 2007-312309 | 11/2007 |
| JP | 2007-336513 | 12/2007 |
| WO | WO 02 088853 | 11/2002 |
| WO | WO 2006 094739 | 9/2006 |

OTHER PUBLICATIONS

Office Action issued in corresponding Japanese Application No. 2008-126540.

* cited by examiner

*Primary Examiner* — Viet Pham
(74) *Attorney, Agent, or Firm* — Frommer Lawrence & Haug LLP; William S. Frommer

(57) ABSTRACT

An information processing apparatus includes a tap operation detecting unit configured to detect the number of tap operations for tapping a housing and a tapped position of the housing, a storage unit storing a plurality of application programs, an activated application table storing an application program to be activated in association with the tapped position of the housing and the number of tap operations, and a control unit configured to detect an application program corresponding to the tapped position and the number of tap operations with reference to the activated application table on the basis of the tapped position and the number of tap operations detected by the tap operation detecting unit, to read out the detected application program from the storage unit, and to activate the detected application program.

13 Claims, 11 Drawing Sheets

FIG. 5

| | IN STANDBY MODE | |
|---|---|---|
| TAPPED POSITION | APPLICATION PROGRAM ACTIVATED IN RESPONSE TO SINGLE TAP OPERATION | APPLICATION PROGRAM ACTIVATED IN RESPONSE TO DOUBLE TAP OPERATION |
| UPPER PART | TV APPLICATION PROGRAM | WEB BROWSING PROGRAM |
| LOWER PART | MUSIC PLAYER PROGRAM | PHONEBOOK MANAGEMENT PROGRAM |
| LEFT PART | EMAIL MANAGEMENT PROGRAM | SCHEDULE BOOK MANAGEMENT PROGRAM |
| RIGHT PART | CAMERA CONTROL PROGRAM | NEAR FIELD WIRELESS COMMUNICATION PROGRAM |

FIG. 7

| ACTIVATED APPLICATION PROGRAM | TAP OPERATION | | ROLL OPERATION | |
|---|---|---|---|---|
| | SINGLE TAP OPERATION | DOUBLE TAP OPERATION | TILT OPERATION | ROTATION OPERATION |
| STILL IMAGE REPRODUCTION (CAMERA CONTROL PROGRAM) | ACTIVATE/ TERMINATE MOTION MODE | ENLARGEMENT/ SAME SIZE DISPLAY SWITCHING PROCESSING | LEFT TILT OPERATION: DISPLAY PREVIOUS IMAGE RIGHT TILT OPERATION: DISPLAY NEXT IMAGE | HORIZONTAL/VERTICAL DISPLAY SWITCHING (EFFECTIVE IN NON-MOTION MODE) |
| WEB BROWSING PROGRAM | ACTIVATE/ TERMINATE MOTION MODE | DISPLAY MODE SWITCHING PROCESSING | UP TILT OPERATION: UP SCROLL DOWN TILT OPERATION: DOWN SCROLL LEFT TILT OPERATION: LEFT SCROLL RIGHT TILT OPERATION: RIGHT SCROLL | HORIZONTAL/VERTICAL DISPLAY SWITCHING (EFFECTIVE IN NON-MOTION MODE) |
| TV APPLICATION PROGRAM | ACTIVATE/ TERMINATE MOTION MODE | PROGRAM INFORMATION DISPLAY ON/OFF | UP TILT OPERATION: VOLUME UP DOWN TILT OPERATION: VOLUME DOWN LEFT TILT OPERATION: CH UP RIGHT TILT OPERATION: CH DOWN | HORIZONTAL/VERTICAL DISPLAY SWITCHING (EFFECTIVE IN NON-MOTION MODE) |
| RECEPTION OF VOICE CALL/VIDEO CALL (COMMUNICATION PROGRAM) | | STOP RECEPTION NOTIFICATION PROCESSING (RING ALERT, VIBRATOR) CONTINUE RECEPTION PROCESSING | | |
| RECEPTION OF EMAIL/SMS (EMAIL MANAGEMENT PROGRAM) | | STOP RECEPTION NOTIFICATION PROCESSING (RING ALERT, VIBRATOR, HIDE RECEPTION NOTIFICATION SCREEN) | | |

VERTICAL→HORIZONTAL ROTATION
HORIZONTAL→VERTICAL ROTATION

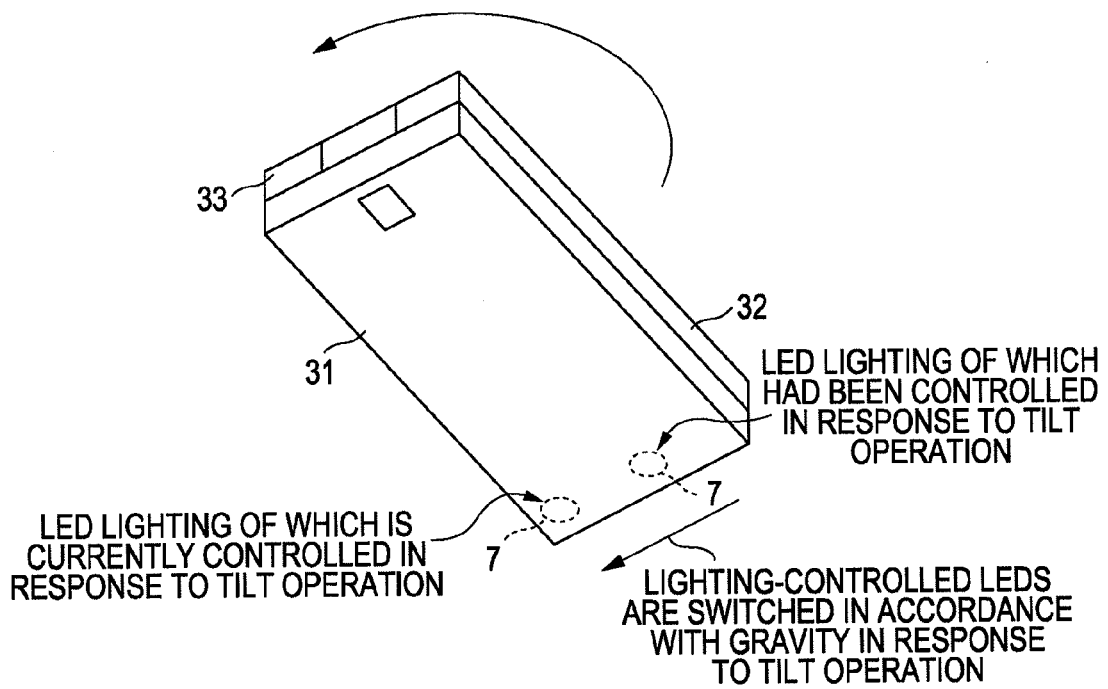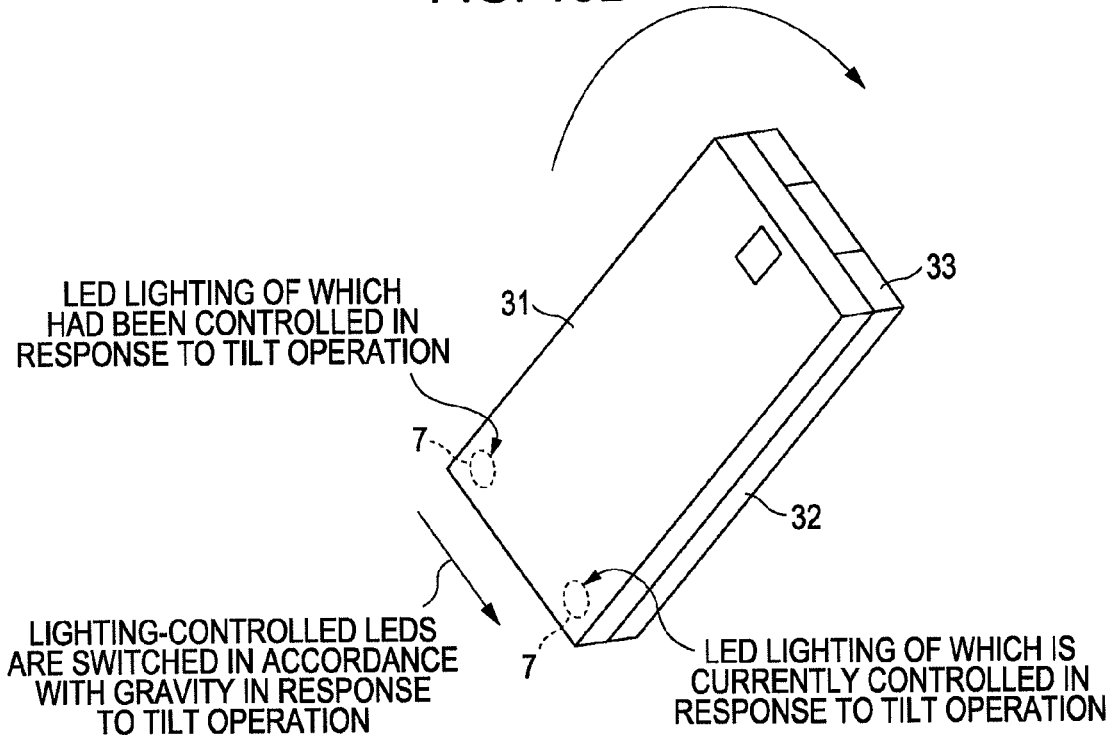

INFORMATION PROCESSING APPARATUS, INFORMATION PROCESSING METHOD, INFORMATION PROCESSING PROGRAM, AND MOBILE TERMINAL

BACKGROUND OF THE INVENTION

1. Field of the Invention

The present invention relates generally to information processing apparatuses, information processing methods, information processing programs, and mobile terminals suitably applied to electronic devices, such as, for example, mobile phones, personal handyphone systems (PHS), personal digital assistants (PDA), portable video game machines, and notebook or desktop personal computers (PC).

More particularly, the present invention relates to an information processing apparatus, an information processing method, an information processing program, and a mobile terminal capable of activating a desired application program and specifying desired information processing of the activated application program in accordance with the number of tap operations for tapping a housing and a tapped position of the housing.

2. Description of the Related Art

Japanese Unexamined Patent Application Publication No. 2006-333355 (pp. 8-10, FIGS. 3 and 4) discloses a mobile information processing apparatus for reducing malfunctions caused by user operations applied from the outside of a main body to improve usability and applicability thereof.

The mobile information processing apparatus detects an operation for "shaking" a housing thereof with an acceleration sensor included therein. The mobile information processing apparatus activates an application program corresponding to a "direction (the X-axis, Y-axis, and Z-axis directions)" that the housing is shaken and the "number of shake operations" and drives a vibrator to vibrate in a vibration pattern corresponding to the "shaking direction" and the "number of shake operations". The vibration pattern of the vibrator allows users to confirm the shaking direction of the housing and the number of shake operations. Accordingly, the mobile information processing apparatus can reduce malfunctions.

SUMMARY OF THE INVENTION

A mobile information processing apparatus disclosed in Japanese Unexamined Patent Application Publication No. 2006-333355 advantageously allows users to confirm a direction that a housing is shaken and the number of shake operations through a vibration pattern of a vibrator. Since an application program to be activated is specified by an operation for "shaking the housing", a big specification gesture is performed to specify the application program. However, it is difficult to perform the big specification gesture in, for example, a crowded train.

In view of the above-described circumstance, it is desirable to provide an information processing apparatus, an information processing method, an information processing program, and a mobile terminal capable of activating a desired application program and specifying desired information processing through a small specification gesture by specifying the application program to be activated and the information processing in accordance with the number of tap operations for tapping a housing and a tapped position of the housing.

According to an embodiment of the present invention, an information processing apparatus includes a tap operation detecting unit configured to detect the number of tap operations for tapping a housing and a tapped position of the housing, a storage unit storing a plurality of application programs, an activated application table storing an application program to be activated in association with the tapped position of the housing and the number of tap operations, and a control unit configured to detect an application program corresponding to the tapped position and the number of tap operations with reference to the activated application table on the basis of the tapped position and the number of tap operations detected by the tap operation detecting unit, to read out the detected application program from the storage unit, and to activate the detected application program.

According to the embodiment of the present invention, an application program to be activated and desired information processing can be specified in accordance with the number of tap operations for tapping a housing and a tapped position of the housing. With such a configuration, a desired application program can be activated and desired information processing can be specified through a small specification gesture, namely, a tap operation.

According to an embodiment of the present invention, a desired application program can be activated and desired information processing can be specified through a small specification gesture, namely, a tap operation.

BRIEF DESCRIPTION OF THE DRAWINGS

FIG. 5 is a diagram showing an example of application programs to be activated through tap operations;

FIG. 7 is a diagram showing an example of information processing of activated application programs that can be specified through tap operations.

FIGS. 10A and 10B are diagrams showing states where light-emission of light emitting diodes (LED) of a mobile phone according to an embodiment of the present invention is controlled.

DESCRIPTION OF THE PREFERRED EMBODIMENTS

An embodiment of the present invention can be applied to a flip mobile phone.

[Electric Configuration of Mobile Phone]

Figure 1:
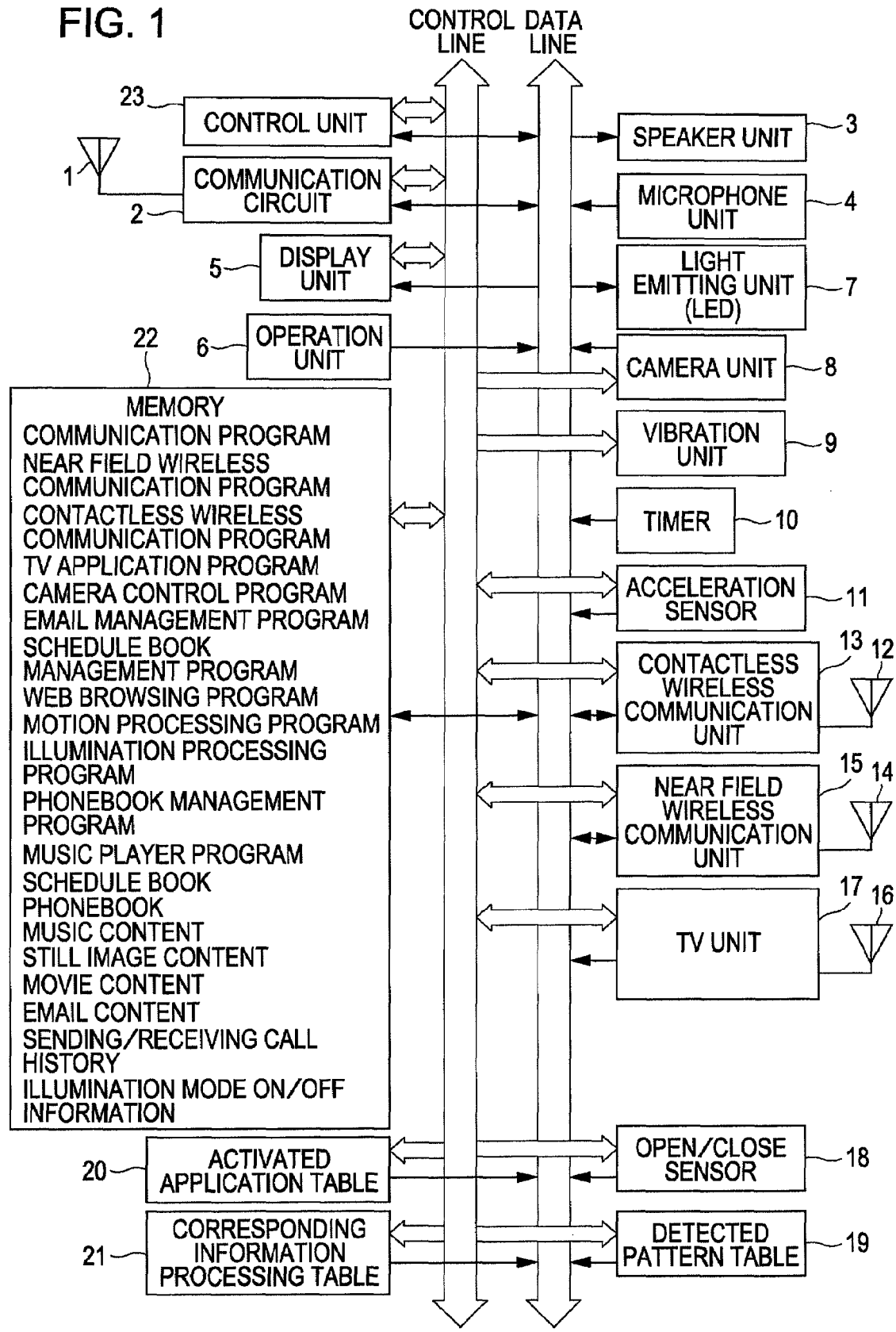
FIG. 1 is a block diagram of a mobile phone according to an embodiment of the present invention.

FIG. 1 is a block diagram of a mobile phone according to an embodiment of the present invention. As shown in FIG. 1, the mobile phone according to this embodiment includes an antenna 1, a communication circuit 2, a speaker unit 3, a microphone unit 4, a display unit 5, an operation unit 6, and a light emitting unit (light emitting diodes (LEDs)) 7. The antenna 1 and the communication circuit 2 are for wireless communication, such as voice call communication, video call communication, email communication, and web (world wide web) data communication, with a base station. The speaker unit 3 outputs received audio. The microphone unit 4 captures sound, such as voice to be transmitted. The display unit 5 displays an operation menu, emails, and images (still images and movies). The operation unit 6 includes a plurality of operation keys, such as arrow keys, a set key, and numeral keys. The light emitting unit 7 informs users of transmission or reception of calls and emails with light. Light-emission of the light emitting unit 7 is controlled in accordance with tilt (attitude) of the mobile phone.

The mobile phone also includes a camera unit 8, a vibration unit 9, a timer 10, a so-called three-axis acceleration sensor 11, a contactless wireless communication antenna 12, and a contactless wireless communication unit 13. The camera unit 8 captures still images and movies of a desired subject. The vibration unit 9 informs users of transmission and reception of calls and emails by vibrating a housing of the mobile phone. The timer 10 counts time. The acceleration sensor 11 detects acceleration in three directions, namely, the X-axis, Y-axis, and Z-axis directions. The contactless wireless communication antenna 12 and the contactless wireless communication unit 13 are for contactless wireless communication. As described later, the acceleration sensor 11 detects vibration caused by a user's tap operation for tapping the housing of the mobile phone with a finger, a tilt operation for tilting the housing of the mobile phone, and a rotation operation for rotating the housing of the mobile phone.

In addition, the mobile phone includes a near field wireless communication antenna 14, a near field wireless communication unit 15, a television (TV) antenna 16, a TV unit 17, an open/close sensor 18, and a detected pattern table 19. The near field wireless communication antenna 14 and the near field wireless communication unit 15 are for near field wireless communication. The TV antenna 16 and the TV unit 17 receive television broadcasting, such as terrestrial digital broadcasting. The open/close sensor 18 detects an open/close state of an upper housing and a lower housing of the flip mobile phone. The detected pattern table 19 stores tapped positions of the housing of the mobile phone in association with acceleration patterns detected by the acceleration sensor 11 at the time of tap operations.

Additionally, the mobile phone includes an activated application table 20, a corresponding information processing table 21, a memory 22, and a control unit 23. The activated application table 20 stores information indicating application programs to be activated in accordance with a tapped position of the housing and the number of tap operations performed in a standby mode. The corresponding information processing table 21 stores information indicating processing to be executed in response to a tap operation or a roll operation (a tilt operation or a rotation operation) while each application program is active. The memory 22 stores a communication program for performing wireless communication processing via base stations, various application programs, various kinds of data (content) handled by each of the application programs. The control unit 23 controls operations of the mobile phone.

In addition to the communication program, the memory 22 stores a near field wireless communication program for controlling near field wireless communication, a contactless wireless communication program for controlling contactless wireless communication, a TV application program for controlling viewing and recording of TV broadcasting, a camera control program for controlling an image capturing operation of the camera unit 8 and providing a viewer function of captured still images and movies, an email management program for controlling creation, transmission, and reception of emails, and a schedule book management program for managing a schedule book including a user's schedule.

The memory 22 also stores a web browsing program for use in browsing of web sites disclosed on a server provided over a predetermined network, such as a communication network and the Internet, a motion processing program for controlling activation of an application program corresponding to a tap operation, a tilt operation, and a rotation operation detected by the acceleration sensor 11 and controlling information processing of the activated application program, an illumination processing program for controlling light-emission of the light emitting unit (LED) 7 in accordance with tilt (attitude) of the mobile phone detected by the acceleration sensor 11, a phonebook management program for managing a phonebook, and a music player program for playing music content.

In addition, the memory 22 stores a schedule book in which a user's desired schedule is registered, a phonebook in which user names, still images (photos of faces), addresses, phone numbers, email addresses, and birthdays of acquaintances and friends of the user are registered, music content to be played based on the music player program, still image content and movie content to be played based on the viewer function of the camera control program, transmitted and received emails, and a transmission/reception history of calls and emails.

[External Electrical Configuration of Mobile Phone]

Figure 2:
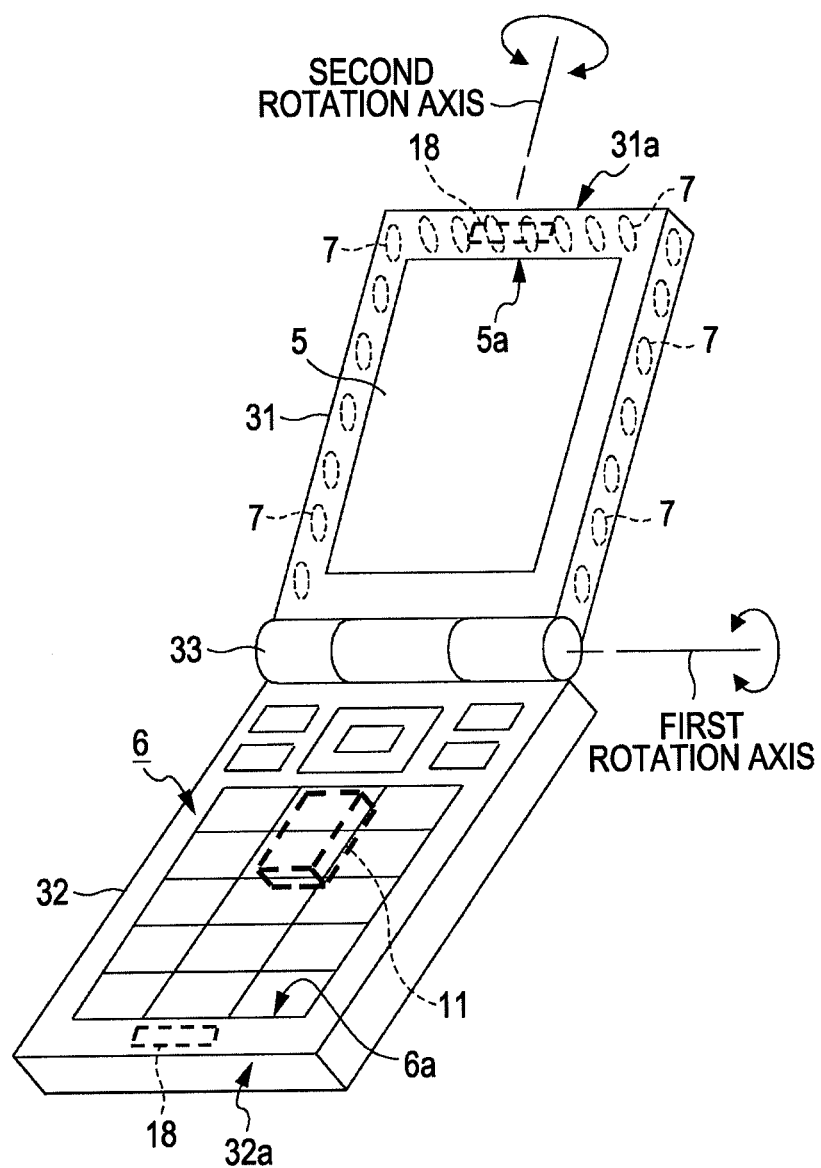
FIG. 2 is a perspective view of an opened mobile phone according to an embodiment of the present invention.

FIG. 2 shows external appearance of the mobile phone according to an embodiment. As shown in FIG. 2, the mobile phone according to this embodiment is a flip mobile phone having an upper housing 31 and a lower housing 32 connected with each other by a hinge 33.

The upper housing 31 has the display unit 5 on a surface that is exposed when the mobile phone is opened. In addition, as shown by dotted-line circles in FIG. 2, the LEDs 7 are provided along the perimeter of the upper housing 31. As described later, light-emission of each of the LEDs 7 provided along the perimeter of the upper housing 31 is controlled in accordance with tilt (attitude) of the mobile phone on the basis of the illumination processing program.

The lower housing 32 includes the operation unit 6 having a plurality of operation keys, such as arrow keys, a set key, and numeral keys, on a surface opposing to the display unit 5 provided at the upper housing 21 when the mobile phone is closed. In addition, as shown by a dotted-line box in FIG. 2, the acceleration sensor 11 is provided substantially at the center of the lower housing 32.

The upper housing 31 and the lower housing 32 have a pair of open/close sensors 18 at opposing positions when the mobile phone is closed. In the example shown in FIG. 2, the open/close sensors 18 are provided between an end 31a of the upper housing 31 opposite to the hinge side and an upper end 5a of the display unit 5 and between an end 32a of the lower housing 32 opposite to the hinge side and a lower end 6a of the operation unit 6. The positions of the open/close sensors 18 are only an example. The open/close sensors 18 may be provided at other positions shown in FIG. 2, e.g., other positions in the upper housing 31, the lower housing 32, and the hinge 33.

The hinge 33 is a so-called two-axis hinge having a first rotation axis provided along a short axis direction of the housings 31 and 32 and a second rotation axis vertical to the first rotation axis. Accordingly, as shown in FIG. 2, the housings 31 and 32 of the mobile phone can be opened longitudinally along the first rotation axis. In addition, the mobile phone can be closed with the display unit 5 being exposed to the outside by rotating the upper housing 31 along the second rotation axis while keeping the rotation angle between the upper and lower housings 31 and 32 substantially at 90 degrees.

[Application Program Activation Control by Tap Operation]

Figure 3:
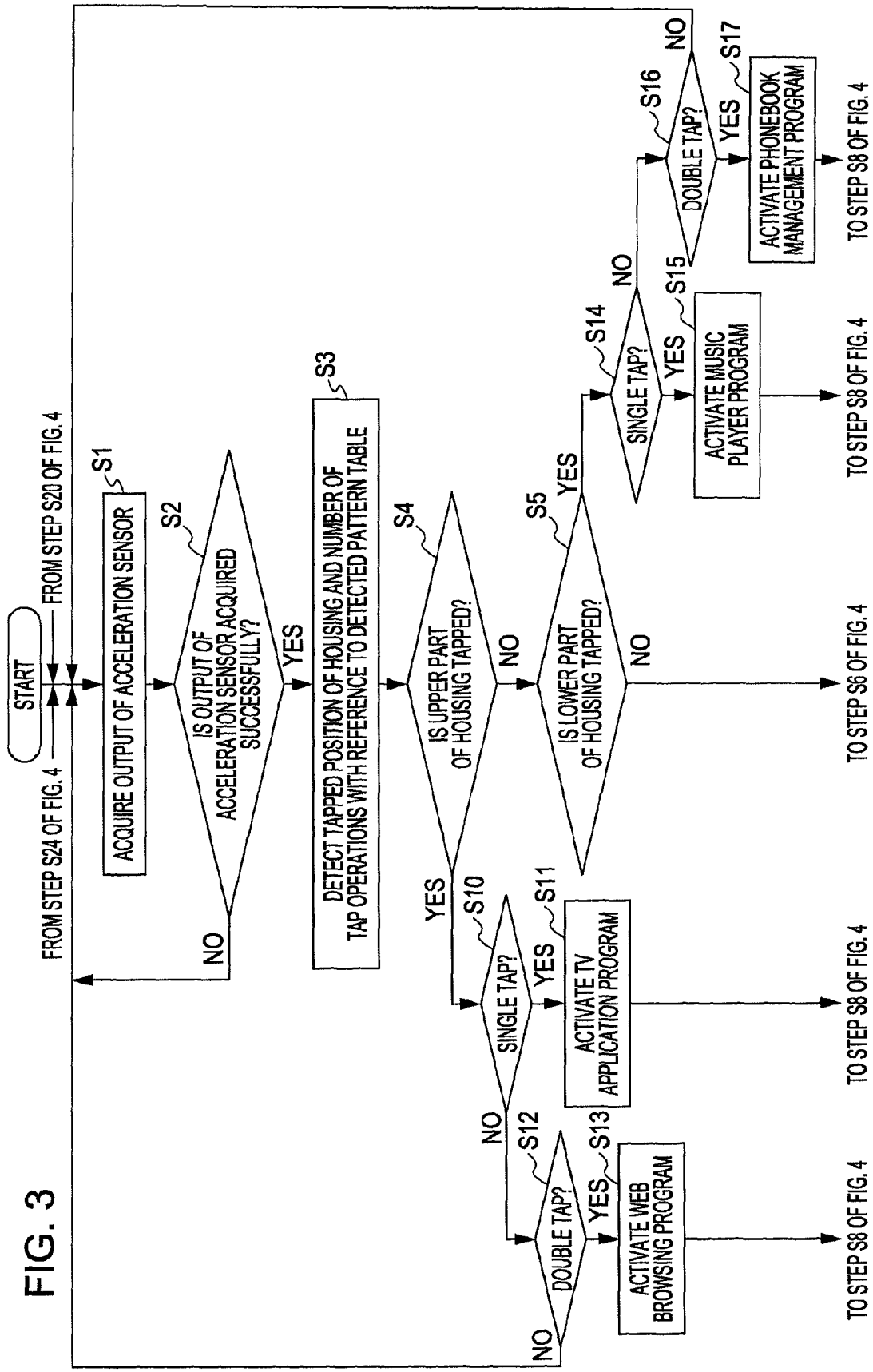
FIG. 3 is a flowchart showing a flow of a first half of processing for activating an application program based on tap operations performed on a mobile phone according to an embodiment of the present invention.
Figure 4:
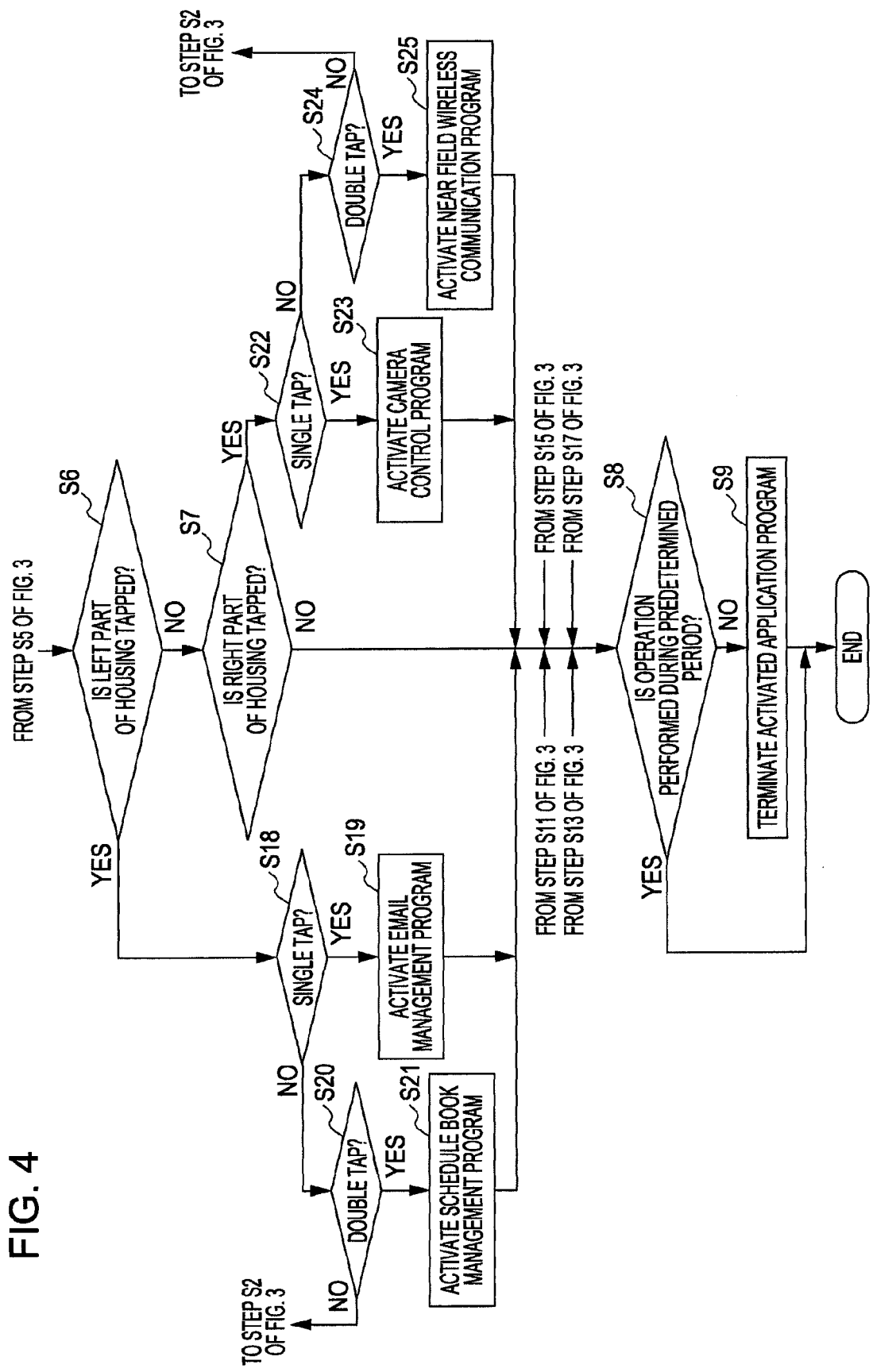
FIG. 4 is a flowchart showing a flow of a last half of processing for activating an application program based on tap operations performed on a mobile phone according to an embodiment of the present invention.

In the mobile phone according to such an embodiment, a user can activate a desired application program by tapping a predetermined position of the mobile phone with a finger. A flow of application program activation control based on tap operations is shown in flowcharts shown in FIGS. 3 and 4. The flowcharts shown in FIGS. 3 and 4 show a processing flow based on the "motion processing program" stored in the memory 22 shown in FIG. 1. The flowchart shown in FIG. 3 describes a first half of the application program activation control based on tap operations, whereas the flowchart shown in FIG. 4 describes a last half of the application program activation control based on tap operations.

During a standby mode for waiting for reception of a call or an email, the control unit 23 monitors an output of the acceleration sensor 11 at STEPs S1 and S2 of the flowchart shown in FIG. 3, thereby detecting existence or absence of a tap operation. In response to detection of the tap operation, the process proceeds to STEP S3.

At STEP S3, the control unit 23 determines whether the mobile phone is opened or closed on the basis of an output detected by the open/close sensor 18. The control unit 23 detects a tapped position of the housing and the number of tap operations with reference to the detected pattern table 19 based on the open/close determination result and the output of the acceleration sensor 11.

More specifically, the detected pattern table 19 stores detected patterns corresponding to respective positions of the upper and lower housings 31 and 32 tapped when the mobile phone is opened and detected patterns corresponding to respective positions of the upper and lower housings 31 and 32 tapped when the mobile phone is closed.

As described using FIG. 2, the mobile phone according to the embodiment has the acceleration sensor 11 at a fixed position substantially at the center of the lower housing 32. Accordingly, the vibration patterns detected by the acceleration sensor 11 differ depending on positions tapped by a user when the mobile phone is opened and closed. The detected pattern table 19 previously stores the detected patterns corresponding to the respective positions tapped when the mobile phone is opened and the detected patterns corresponding to the respective positions tapped when the mobile phone is closed (the user may actually tap positions of the housings and register detected patterns corresponding to the tapped positions in the detected pattern table 19).

In this manner, at STEP S3, the control unit 23 determines whether the mobile phone is opened or closed on the basis of the output from the open/close sensor 18. The control unit 23 then detects the tapped position of the housing with reference to the detected pattern table 19 on the basis of the open/close determination result and the output from the acceleration sensor 11. The control unit 23 also detects the number of the outputs of the acceleration sensor 11, thereby detecting the number of tap operations.

After detecting the tapped position and the number of tap operations in this manner, the control unit 23 controls activation of an application program corresponding to the detected tapped position and number of tap operations with reference to the activated application table 20 shown in FIG. 1. For ease of understanding, the description will be given below for a case where the control unit 23 detects positions of upper, lower, left, and right parts of the housing tapped when the mobile phone is closed and the number of tap operations, and activates a corresponding application program.

After detecting the tapped position and the number of tap operations at STEP S3, the control unit 23 determines whether the tapped position is the upper part of the housing, the lower part of the housing, the left part of the housing, or the right part of the housing at STEPs S4 and S5 of the flowchart shown in FIG. 3 and at STEPS S6 and S7 of the flowchart shown in FIG. 4, respectively.

If it is determined that the tapped position is the upper part of the housing, the process proceeds to STEPS S10 and S12. More specifically, the control unit 23 determines whether the user has performed a single tap operation for tapping the housing once or a double tap operation for consecutively tapping the housing twice on the basis of the number of detected tap operations. The control unit 23 recognizes an application program to be activated with reference to the activated application table 20 shown in FIG. 5 based on the tapped position and the number of tap operations. The control unit 23 reads out the recognized application program from the memory 22 to control activation of the application program. In this case, it is assumed that the tapped position is the upper part of the housing. If the single tap operation is performed, the control unit 23 recognizes a TV application program as the application program to be activated as shown in FIG. 5, and controls activation of the TV application program at STEP S11 of the flowchart shown in FIG. 3. If the double tap operation is performed, the control unit 23 recognizes a web browsing program as the application program to be activated as shown in FIG. 5, and controls activation of the web browsing program at STEP S13 of the flowchart shown in FIG. 3.

Similarly, upon determining that the tapped position is the lower part of the housing, the process proceeds to STEPs S14 and S16. The control unit 23 determines whether the user has performed the single tap operation or the double tap operation based on the number of detected tap operations. The control unit 23 refers to the activated application table 20 shown in FIG. 5 based on the tapped position and the number of tap operations. In this case, it is assumed that the tapped position is the lower part of the housing. If the single tap operation is performed, the control unit 23 recognizes a music player program as the application program to be activated as shown in FIG. 5, and controls activation of the music player program at STEP S15 of the flowchart shown in FIG. 3. If the double tap operation is performed, the control unit 23 recognizes a phonebook management program as the application program to be activated as shown in FIG. 5, and controls activation of the phonebook management program at STEP S17 of the flowchart shown in FIG. 3.

Likewise, if it is determined that the tapped position is the left part of the housing, the process proceeds to STEPs S18 and S20. The control unit 23 determines whether the user has performed the single tap operation or the double tap operation based on the number of detected tap operations. The control unit 23 then refers to the activated application table 20 shown in FIG. 5 based on the tapped position and the number of tap operations. In this case, it is assumed that the tapped position is the left part of the housing. If the single tap operation is performed, the control unit 23 recognizes an email management program as the application program to be activated as shown in FIG. 5, and controls activation of the email management program at STEP S19 of the flowchart shown in FIG. 4. If the double tap operation is performed, the control unit 23 recognizes a schedule book management program as the application program to be activated as shown in FIG. 5, and controls activation of the schedule book management program at STEP S21 of the flowchart shown in FIG. 4.

Similarly, if it is determined that the tapped position is the right part of the housing, the process proceeds to STEPs S22 and S24. The control unit 23 determines whether the user has performed the single tap operation or the double tap operation based on the number of detected tap operations. The control unit 23 then refers to the activated application table 20 shown in FIG. 5 based on the tapped position and the number of tap operations. In this case, it is assumed that the tapped position is the right part of the housing. If the single tap operation is performed, the control unit 23 recognizes a camera control program as the application program to be activated as shown in FIG. 5, and controls activation of the camera control program at STEP S23 of the flowchart shown in FIG. 4. If the double tap operation is performed, the control unit 23 recognizes a near field wireless communication program as the application program to be activated as shown in FIG. 5, and controls activation of the near field wireless communication program at STEP S25 of the flowchart shown in FIG. 4.

After controlling activation of the application program corresponding to the tapped position and the number of tap operations in this manner, the control unit 23 starts acquiring time information counted by the timer 10 at the time of the activation of the application program. At STEP S8 of the flowchart shown in FIG. 4, the control unit 23 determines whether a tap operation or an operation on a button of the operation unit 6 is performed within a predetermined period, e.g., 30 seconds, from the activation of the application program.

If the tap operation or the operation on the button of the operation unit 6 is performed within the predetermined period from the activation of the application program, it is indicated that the user performs an operation for the activated application program. Accordingly, if the control unit 23 detects the tap operation or the operation on the button of the operation unit 6 within the predetermined period since the activation of the application program, the control unit 23 terminates the processing for controlling the activation of the application program in response to the tap operation shown in FIGS. 3 and 4.

If the tap operation or the operation on the button of the operation unit 6 is not performed within the predetermined period from the activation of the application program, it is indicated that the user's tap operation is highly likely to be an operation mistake (activation mistake). Accordingly, if the control unit 23 does not detect the tap operation or the operation on the button of the operation unit 6 within the predetermined period since the activation of the application program, the process proceeds to STEP S9. At STEP S9, the control unit 23 controls termination of the activated application program. In this manner, even if the application program is activated in response to an operation mistake, the application program can be automatically terminated.

[Tap Operation for Activated Application Program]

Figure 6:
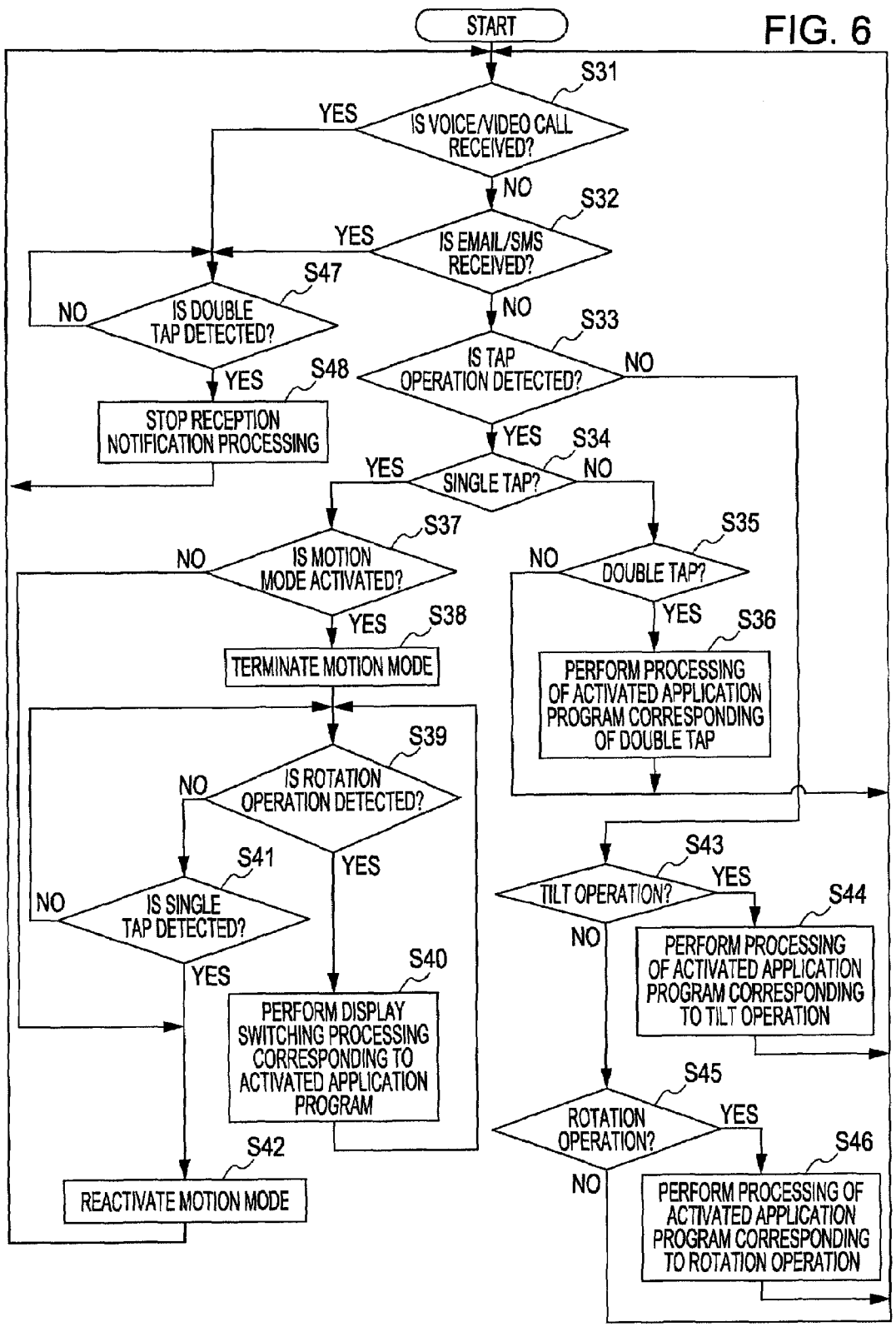
FIG. 6 is a flowchart showing a flow of processing for specifying desired information processing of an activated application program through tap operations performed on a mobile phone according to an embodiment of the present invention.

The mobile phone according to this embodiment can specify desired information processing of the activated application program through a tap operation, a housing tilt operation, and a housing rotation operation. More specifically, after activation of an application program, the control unit 23 automatically switches an operation mode into a "motion mode", in which the desired information processing of the application program can be specified through a tap operation, a housing tilt operation, and a housing rotation operation, A flowchart shown in FIG. 6 shows a flow of information processing control performed in the motion mode. After activating the application program specified by the user based on the tap operation, the control unit 23 starts processing shown in the flowchart of FIG. 6 based on the "motion processing program" stored in the memory 22 shown in FIG. 1.

At STEP S31, the control unit 23 determines whether a voice call or a video call is received when the application program is active. If the control unit 23 detects reception of the voice call or the video call, the process proceeds to STEP S47. If the control unit 23 does not detect reception of the voice call or the video call, the process proceeds to STEP S32.

Upon detecting reception of the voice call or the video call, the control unit 23, for example, controls output of a ring alert through the speaker unit 3, drives the vibration unit 9 to vibrate, and controls the light emitting unit 7 to emit light in a predetermined color. The control unit 23 also performs call reception notification processing for displaying a name and a phone number of a partner on the display unit 5. At STEP S47, the control unit 23 determines whether the user has performed a double tap operation based on an output from the acceleration sensor 11. If the control unit 23 detects the double tap operation, the process proceeds to STEP S48. At STEP S48, the control unit 23 stops controlling output of the ring alert and driving of the vibration unit 9.

More specifically, the corresponding information processing table 21 shown in FIG. 7 defines that the control unit 23 stops controlling output of the ring alert and driving of the vibration unit 9 after the mobile phone according to the embodiment receives a voice call or a video call when the application program is active.

Accordingly, upon detecting reception of a voice call or a video call, the control unit 23 performs the call reception notification processing and monitors existence or absence of a double tap operation. Upon detecting the double tap operation, the control unit 23 stops controlling output of the ring alert and driving of the vibration unit 9. The control operations to be stopped in response to the double tap operation are output of the ring alert and driving of the vibration unit 9. Accordingly, the control unit 23 continues to control light-emission of the light emitting unit 7 and displaying of a name and a phone number of a partner on the display unit 5 as long as the incoming call continues. In this manner, ordinal call reception notification, such as control of output of the ring alert and driving of the vibration unit 9, is performed until the user performs the double tap operation. After the double tap operation, so-called silent call reception notification through controlling of light-emission of the light emitting unit 7 and displaying of information on the display unit 5 is performed while the incoming call continues.

If the control unit 23 determines that the voice call or the video call is not received when the application program is active, the process proceeds to STEP S32. At STEP S32, the control unit 23 determines whether an email directed to an email address or a short message service (SMS) directed to a phone number is received when the application program is active. If the control unit 23 detects reception of the email or the SMS, the process proceeds to STEP S47. If the control unit 23 does not detect reception of the email or the SMS, the process proceeds to STEP S33.

Upon detecting reception of the email or the SMS, the control unit 23 stores the received email or SMS in the memory 22. After storing of the email or the SMS, the control unit 23 performs mail reception notification processing, for example, for controlling output of a ring alert through the speaker unit 3, driving the vibration unit 9 to vibrate, controlling the light emitting unit 7 to emit light in a predetermined color, and displaying a name and a phone number of a partner on the display unit 5. In addition to this mail reception notification processing, the control unit 23 also determines whether the user has performed a double tap operation based on an output from the acceleration sensor 11 at STEP S47. If the control unit 23 detects the double tap operation, the process proceeds to STEP S48. At STEP S48, the control unit 23 stops the mail reception notification processing, such as controlling of output of the ring alert and driving of the vibration unit 9.

More specifically, the corresponding information processing table 21 shown in FIG. 7 defines that the control unit 23 terminates the mail reception notification processing upon detecting a double tap operation after the mobile phone according to the embodiment receives an email or an SMS while the application program is active.

Accordingly, upon detecting reception of an email or an SMS, the control unit 23 performs the above-described mail reception notification processing after storage of the email or the SMS and monitors existence or absence of a double tap operation. Upon detecting the double tap operation, the control unit 23 stops the mail reception notification processing. In this manner, the mail reception notification processing, such as controlling of output of the ring alert and driving of the vibration unit 9, is performed until the user performs the double tap operation. The mail reception notification processing is terminated in response to the double tap operation.

If the control unit 23 does not detect reception of a voice call or an email, the process proceeds to STEP S33. At STEP S33, the control unit 23 monitors existence or absence of a tap operation based on an output from the acceleration sensor 11. If the tap operation is detected, the process proceeds to STEP S34. Otherwise, the process proceeds to STEP S43.

If the tap operation is detected, the process proceeds to STEP S34. At STEP S34, the control unit 23 determines whether the detected tap operation is a single tap operation. If the control unit 23 determines that the detected tap operation is a single tap operation, the process proceeds to STEP S37. At STEP S37, the control unit 23 determines whether a motion mode, in which desired information processing of the active application program can be specified through a tap operation, a housing tilt operation, and a housing rotation operation, is currently active. If the motion mode is active, the process proceeds to STEP S38. At STEP S38, the control unit 23 terminates the motion mode. If the motion mode is not active, the process proceeds to STEP S42. At STEP S42, the control unit 23 reactivates the motion mode. The process then returns to STEP S31.

More specifically, in the mobile phone according to this embodiment, the corresponding information processing table 21 shown in FIG. 7 defines that a single tap operation performed when an application program is active is an operation for activating/terminating the motion mode. Accordingly, if a single tap operation is detected when the application program is active at STEP S34, the control unit 23 determines whether the motion mode is currently active at STEP S37. If the motion mode is active, the control unit 23 terminates the motion mode at STEP S38. If the motion mode is not active, the control unit 23 reactivates the motion mode at STEP S42.

As described above, the user specifies activation/termination of the motion mode by a single tap operation when the application program is active. Even if the motion mode is not activated, a rotation operation is permitted depending on kinds of the active application program.

Figure 8A:
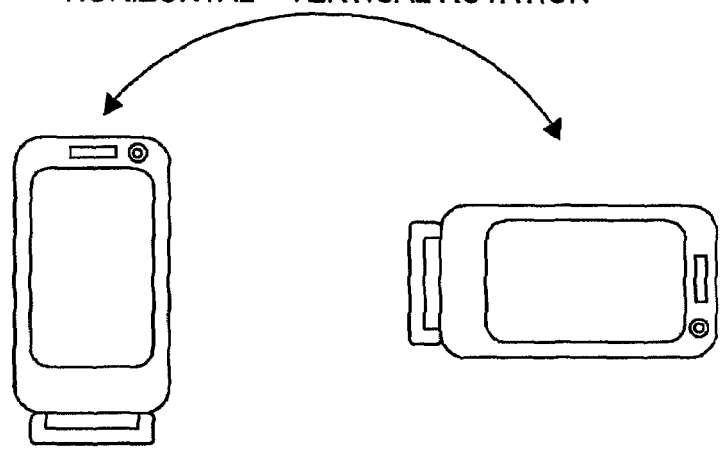
FIGS. 8A to 8C are schematic diagrams for illustrating a rotation operation and a tilt operation performed on a mobile phone according to an embodiment of the present invention.

For example, regarding the mobile phone according to this embodiment, the corresponding information processing table 21 shown in FIG. 7 defines that horizontal/vertical display switching of a display screen is performed in response to housing rotation operations, i.e., "vertical to horizontal display rotation" or "horizontal to vertical display rotation" shown in FIG. 8A, when the user is browsing still images and movies using the viewer function of the camera control program, when the user is browsing a web site based on the web browsing program, and when the user is viewing television broadcasting based on the TV application program.

After terminating the motion mode at STEP S38 of the flowchart shown in FIG. 6, the control unit 23 monitors existence or absence of the rotation operation based on an output from the acceleration sensor 11 at STEP S39. If the control unit 23 detects the rotation operation, the process proceeds to STEP S40. At STEP S40, the control unit 23 performs display switching processing. More specifically, the control unit 23 enlarges a television image, which has been displayed in a small size on a vertical screen of the display unit 5, on a horizontal screen or reduces the size of the television image, which has been displayed in a large size on the horizontal screen of the display unit 5, on the vertical screen.

If the control unit 23 detects a single tap operation at STEP S41 while monitoring of existence or absence of the rotation operation, the control unit 23 reactivates the motion mode at STEP S42. The process then returns to STEP S31.

If the control unit 23 determines that the tap operation detected at STEP S33 is not a single tap operation, the process proceeds to STEP S35. At STEP S35, the control unit 23 determines whether the detected tap operation is a double tap operation. If the control unit 23 determines that the detected tap operation is a double tap operation, the process proceeds to STEP S36. At STEP S36, the control unit 23 performs information processing of the active application program corresponding to the double tap operation.

More specifically, for example, if the control unit 23 detects a double tap operation when a still image based on the viewer function of the camera control program is displayed, the control unit 23 performs display switching processing to enlarge the displayed still image or returns the size of the display still image to the original size as shown by the corresponding information processing table 21 in FIG. 7. If the control unit 23 detects a double tap operation when a web site based on the web browsing program is displayed, the control unit 23 switches a display mode as shown by the corresponding information processing table 21 in FIG. 7. In addition, if a double tap operation is detected when a television image based on the TV application program is displayed, the control unit 23 displays or hides program information as shown by the corresponding information processing table 21 in FIG. 7.

Figure 8B:
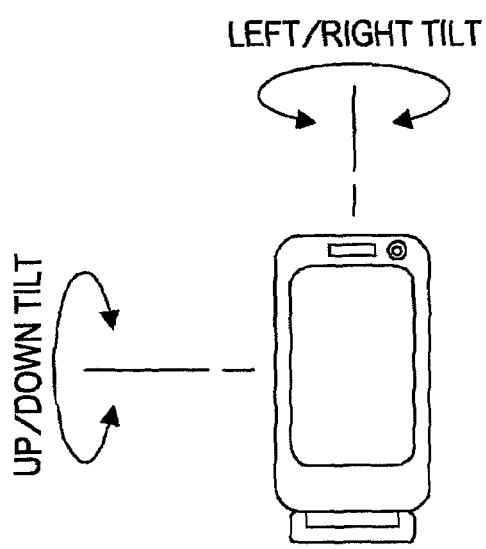
Figure 8C:
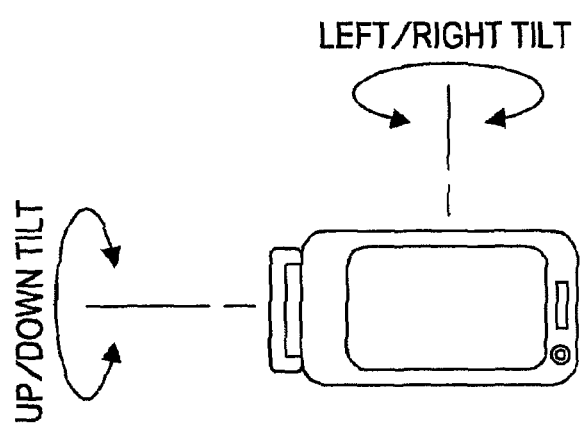

If the tap operation is not detected at STEP S33, the process proceeds to STEP S43. At STEP S43, the control unit 23 determines whether a tilt operation shown in FIG. 8B or 8C is performed based on an output from the acceleration sensor 11. If the control unit 23 detects the tilt operation, the process proceeds to STEP S44. At STEP S44, the control unit 23 performs information processing of the active application program corresponding to the tilt operation.

More specifically, for example, if the control unit 23 detects a left tilt operation for tilting the housing to the left when a still image based on the viewer function of the camera control program is displayed, the control unit 23 displays the previous still image again as shown by the corresponding information processing table 21 in FIG. 7. If the control unit 23 detects a right tilt operation for tilting the housing to the right, the control unit 23 displays the following still image of the displayed still image as shown by the corresponding information processing table 21 in FIG. 7.

In addition, if the control unit 23 detects an up tilt operation for tilting the housing upward when a web site based on the web browsing program is displayed, the control unit 23 scrolls a display screen of the display unit 5 upward as shown by the corresponding information processing table 21 in FIG. 7. If the control unit 23 detects a down tilt operation for tilting the housing downward, the control unit 23 scrolls the display screen of the display unit 5 downward. If the control unit 23 detects a left tilt operation for tilting the housing to the left, the control unit 23 scrolls the display screen of the display unit 5 in the left direction. If the control unit 23 detects a right tilt operation for tilting the housing to the right, the control unit 23 scrolls the display screen of the display unit 5 in the right direction.

Additionally, if the control unit 23 detects an up tilt operation for tilting the housing upward when a television image based on the TV application program is displayed, the control unit 23 turns up the volume as shown by the corresponding information processing table 21 in FIG. 7. If the control unit 23 detects a down tilt operation for tilting the housing downward, the control unit 23 turns down the volume. If the control unit 23 detects a left tilt operation for tilting the housing to the left, the control unit 23 controls channel-up selection. If the control unit 23 detects a right tilt operation for tilting the housing to the right, the control unit 23 controls channel-down section.

If the tilt operation is not detected at STEP S43, the process proceeds to STEP S45. At STEP S45, the control unit 23 determines whether a rotation operation shown in FIG. 8A is performed based on an output from the acceleration sensor 11. If the control unit 23 detects the rotation operation, the process proceeds to STEP S46. At STEP S46, the control unit 23 performs processing of the active application program corresponding to the rotation application, such as the above-described vertical/horizontal display switching.

[LED Light-Emission Control (Illumination Control) in Accordance With Attitude of Housing]

LED light-emission control according to attitude of a housing of a mobile phone according to an embodiment will now be described. As described using FIG. 2, the plurality of LEDs 7 are consecutively provided along the perimeter of the upper housing 31 of the mobile phone according to this embodiment. The control unit 23 controls light-emission of the LED corresponding to the attitude of the housing when the mobile phone is closed.

Although each LED 7 is provided along the perimeter of the upper housing 31 in this example, the plurality of LEDs 7 may be consecutively provided along the perimeters of the upper and lower housings 31 and 32. In addition, the plurality of LEDs 7 may be consecutively provided along the perimeter of a surface on the display-unit-5 side of the upper housing 31, the perimeter of a surface on a side opposite to the display-unit-5 side of the upper housing 31, the perimeter of a surface on the operation-unit-6 side of the lower housing 32, or the perimeter of a surface on a side opposite to the operation-unit-6 side of the lower housing 32.

The LEDs 7 do not have to be provided along the perimeter but may be provided on the whole surface of the side opposite to the display-unit-5 side of the upper housing 31 and the side opposite to the operation-unit-6 side of the lower housing 32 or in a wavy form on the surface. Furthermore, the LEDs 7 do not have to be provided consecutively. For example, the LEDs 7 may be provided at upper, lower, left, right positions of the perimeter of the upper housing 31, of the surface on the side opposite to the display-unit-5 side of the upper housing 31, the perimeter of the lower housing 32, or of the surface on the side opposite to the operation-unit-6 side of the lower housing 32 (in this case, four LEDs are provided). In addition, by additionally providing one or more LEDs between respective pairs of the four LEDs, 8, 12, or 16, . . . LEDs may be provided.

Figure 9:
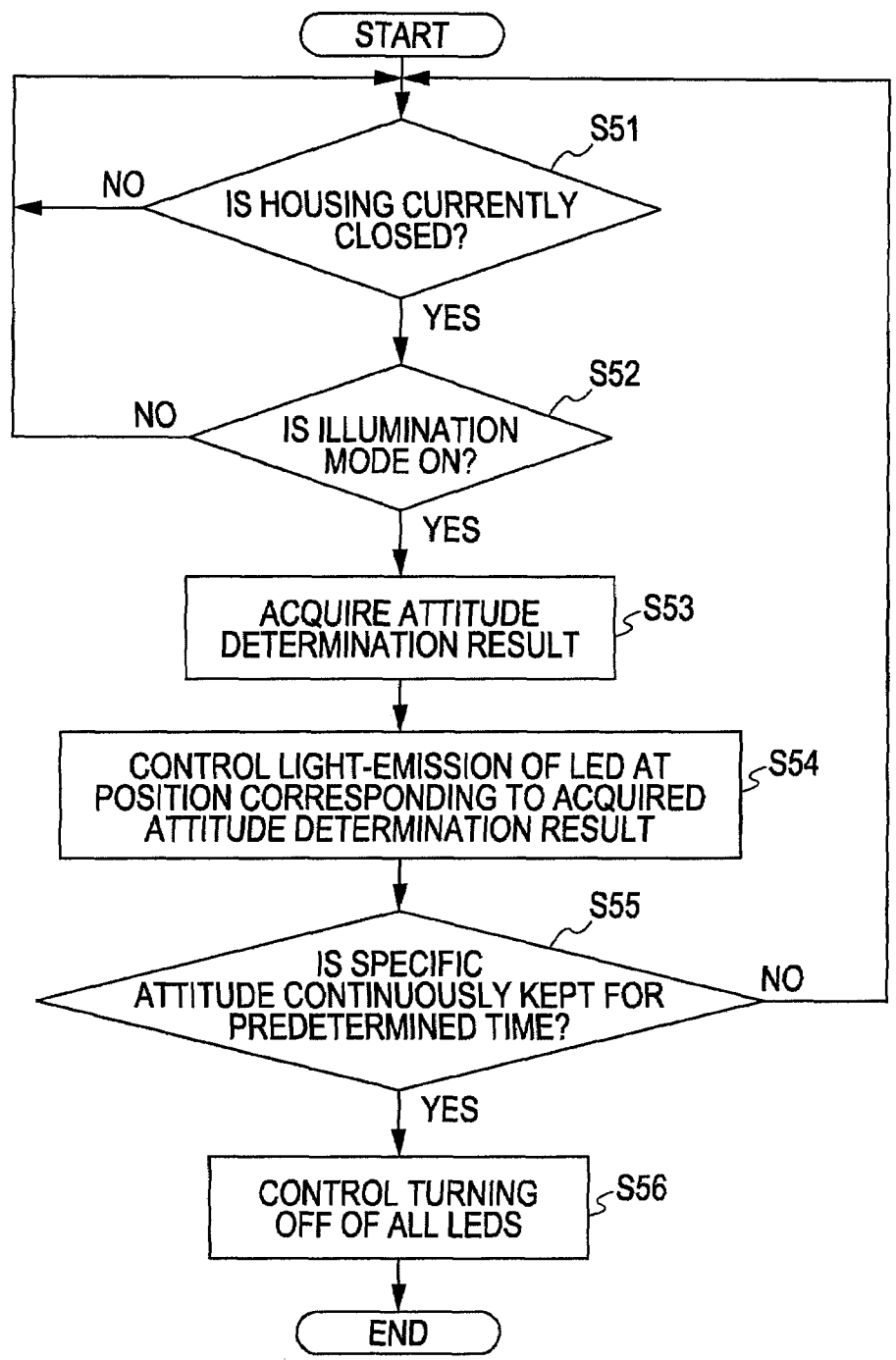
FIG. 9 is a flowchart showing a flow of light-emission control processing in a mobile phone according to an embodiment of the present invention.

A flowchart shown in FIG. 9 shows a flow of LED light-emission control in accordance with the attitude of the housing. The control unit 23 starts the processing shown in this flowchart based on the "illumination processing program" stored in the memory 22 shown in FIG. 1 upon the acceleration sensor 11 detecting motion (the above-described tilt operation and rotation operation) and vibration (the above-described tap operation) of the housing in a standby mode for waiting for reception of a call or an email.

At STEP S51, the control unit 23 acquires an output from the open/close sensor 18 shown in FIGS. 1 and 2 to determine whether the housing of the mobile phone is currently closed. If the control unit 23 determines that the housing is closed, the process proceeds to STEP S52.

At STEP S52, the control unit 23 determines whether LED light-emission control to be performed in accordance with the attitude of the housing is permitted by the user (whether an illumination mode is ON). If the control unit 23 determined that the LED light-emission control is permitted by the user, the process proceeds to STEP S53.

More specifically, the user can select whether to permit execution of the LED light-emission control according to the attitude of the housing of the mobile phone according to the embodiment. Although execution of the light-emission control is initially set (the illumination mode is ON), the user can turn the illumination mode OFF through a setting menu. Illumination mode ON/OFF information is stored in the memory 22. Accordingly, if the control unit 23 determines that the housing is closed in the standby mode, the control unit 23 refers to the illumination mode ON/OFF information stored in the memory 22. If the control unit 23 determines that the illumination mode is ON, the process proceeds to STEP S53.

At STEP S53, the control unit 23 detects tilt (attitude) of the closed housing based on an output from the acceleration sensor 11. At STEP S54, the control unit 23 controls light-emission of the LED 7, among the LEDs 7 provided along the perimeter of the upper housing 31, corresponding to the detected attitude of the housing.

More specifically, at STEP S53, the control unit 23 detects a lowest position of the closed housing from the ground based on the output from the acceleration sensor 11 and detects the LED 7 corresponding to the lowest position from the LEDs 7 consecutively provided along the perimeter of the upper housing 31.

At STEP S54, the control unit 23 controls light-emission of the LED 7, among the LEDs 7, corresponding to the lowest position and turns other LEDS 7 OFF. Alternatively, at STEP S54, the control unit 23 controls, among the LEDs 7, light-emission of the LED 7 corresponding to the lowest position of the upper housing 31 and of one or more LEDs neighboring this LED 7 and turns the other LEDs OFF.

In this manner, the control unit 23 can control light-emission of the LED 7 corresponding to the lowest position (or the LED 7 corresponding to the lowest position and the neighboring LEDs 7 thereof) in accordance with the attitude of the housing. Accordingly, light-emission of the light emitting unit 7 can be controlled in an original, sophisticated, and visually attractive manner as if the gravity of the Earth affected light-emission of the LED 7.

FIGS. 10A and 10B show perspective views of the mobile phone when light-emission of LEDs is controlled in accordance with the attitude of the housing. More specifically, FIG. 10A shows light-emission control of the LEDs 7 when the closed mobile phone is tilted slightly to the left with the hinge 33 being located above. FIG. 10B shows light-emission control of the LEDs 7 when the closed mobile phone is tilted slightly to the right with the hinge 33 being located above.

FIGS. 10A and 10B show examples in which light-emission of the LED 7 located at the lowest position and several LEDs 7 on both sides of the LED 7, among the LEDs 7 provided along the perimeter of the upper casing 31, is controlled.

If the user tilts or rotates the housing from this state, the light-emission-controlled LEDs 7 are shifted as if a drop of water in a U-shaped tube moved in the tube in accordance with the attitude of the housing and the gravity of the Earth. In this manner, light-emission of the LEDs 7 can be controlled in an original, sophisticated, and visually attractive manner.

Here, the control unit 23 changes the LEDs 7 to be controlled in accordance with the attitude of the housing. The control unit 23 performs the control operation so that the luminance of the LEDS 7 gradually drops as time passes when the control unit 23 turns OFF the LEDs 7, which have been ON, in response to a change in the attitude of the housing.

The mobile phone according to the embodiment sequentially changes the LED 7 subjected to the light-emission control to the LEDS 7 neighboring the LED 7 currently subjected to the light-emission control in response to the change in the attitude of the housing. In addition, a luminance difference is provided between the LED 7 currently subjected to the light-emission control and the LED 7 that has been subjected to the light-emission control and is turned OFF while gradually lowering the luminance. The LED 7 that has been subjected to the light-emission control and is turned OFF while gradually lowering the luminance is turned OFF after predetermined time.

A visual effect like a band of light flows along the perimeter of the housing can be demonstrated by turning OFF the LED 7 that has been subjected to the light-emission control while gradually lowering the luminance. In this manner, light-emission of the LED 7 can be controlled in an original, sophisticated, and visually attractive manner.

After the control unit 23 performs such light-emission control, the process proceeds to STEP S55. At STEP S55, the control unit 23 determines whether a predetermined period, such as 30 seconds, has passed since the housing is held in specific attitude based on the time information counted by the timer 10. More specifically, the control unit 23 determines whether a predetermined period, e.g., 30 seconds, has passed since the housing is held horizontally, for example. Continuance of the specific attitude of the housing indicates that the mobile phone is in a resting state, such as a case where the mobile phone is placed on a desk.

Accordingly, if the control unit 23 does not detect that the predetermined period has not passed since the housing is held in the specific attitude (the resting state of the housing is not detected) at STEP S55, the process returns to STEP S51. The control unit 23 then repeatedly executes the above-described light-emission control of the LEDs 7. If the control unit 23 detects that the predetermined period has passed since the housing is held in the specific attitude, the process proceeds to STEP S56. At STEP S56, the control unit 23 turns OFF all of the LEDs 7. The process shown by the flowchart in FIG. 9 then terminates.

By controlling turning off of all of the LEDs 7 after the predetermined period has passed since the housing is held in the specific attitude, inconvenience that the LEDs 7 continue to emit light meaninglessly when the mobile phone is in the resting state, such as the state where the mobile phone is placed on a desk, can be prevented. Accordingly, power consumption can be saved.

[Description on Operations Based on Functional Block Diagram]

"An operation for activating an application program in response to a tap operation", "a tap operation for an active application program", and "an operation for controlling light-emission of LEDs in accordance with attitude of a housing" will now be described using a functional block diagram shown in FIG. 11.

Figure 11:
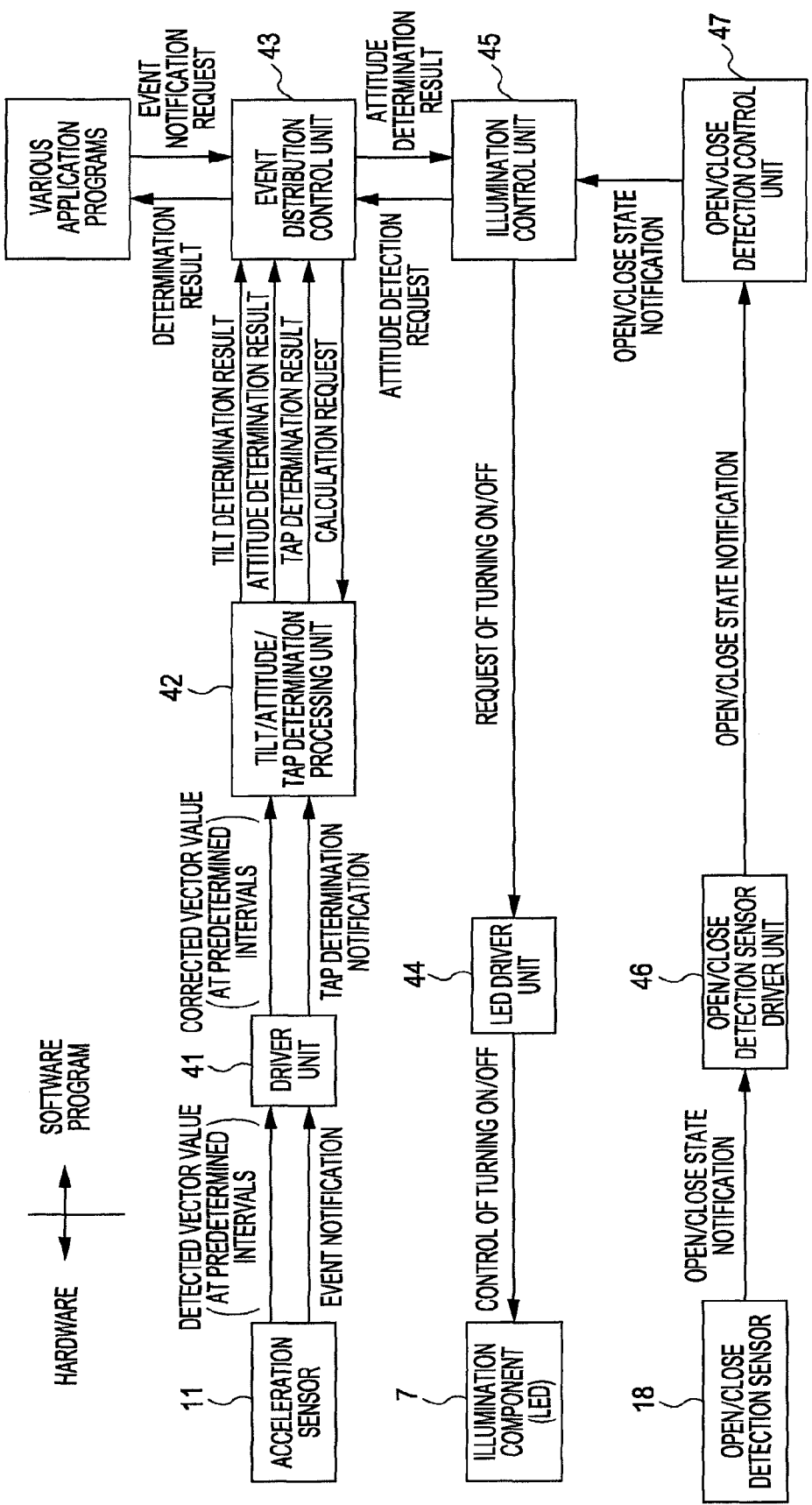
FIG. 11 is a functional block diagram of a mobile phone according to an embodiment of the present invention.

Referring to FIG. 11, the acceleration sensor 11, the illumination components (LEDs) 7, and the open/close detection sensor 18 are hardware. A driver unit 41, a tilt/attitude/tap determination processing unit 42, an event distribution control unit 43, an LED driver unit 44, an illumination control unit 45, an open/close detection sensor driver unit 46, and an open/close detection control unit 47 are functional blocks based on software programs, such as "the motion processing program" or "the illumination processing program", stored in the memory 22 shown in FIG. 1.

Referring to FIG. 11, the acceleration sensor 11 notifies current three-dimensional vector coordinate values (an X-axis coordinate value, a Y-axis coordinate value, and a Z-axis coordinate value) at predetermined intervals. The acceleration sensor 11 also notifies an event at the time of detection of gravitational acceleration motion equal to or larger than a predetermined level.

The driver unit 41 corrects the notified three-dimensional vector coordinate values based on the current three-dimensional vector coordinate values and the even notification supplied from the acceleration sensor 11. The driver unit 41 also performs a condition operation for determining whether to generate a tap event based on the three-dimensional vector coordinate values before and after the event notification. The driver unit 41 supplies the corrected three-dimensional vector coordinate values to the tilt/attitude/tap determination processing unit 42. If the driver unit 41 generates a tap event in the condition operation, the driver unit 41 notifies the tilt/attitude/tap determination processing unit 42 of tap confirmation notification.

In response to an operation request from the event distribution control unit 43, the tilt/attitude/tap determination processing unit 42 performs a tilt determination operation and an attitude determination operation using the corrected three-dimensional vector coordinate values and notifies the event distribution control unit 43 of this determination result. Upon receiving the tap confirmation notification, the tilt/attitude/tap determination processing unit 42 temporarily stores the tap confirmation notification. If the tilt/attitude/tap determination processing unit 42 receives the tap confirmation notification again within a predetermined period, the tilt/attitude/tap determination processing unit 42 notifies the event distribution control unit 43 of the tap determination result of a double tap operation. If the tilt/attitude/tap determination processing unit 42 does not receive the tap confirmation notification again within the predetermined period, the tilt/attitude/tap determination processing unit 42 notifies the event distribution control unit 32 of the tap determination result of a single tap operation.

The event distribution control unit 43 receives an event notification request from various application programs, such as the TV application program and the web browsing program. The event distribution control unit 43 also notifies the application program that has issued the event notification request of the tilt determination result, the attitude determination result, and the tap determination result supplied from the tilt/attitude/tap determination processing unit 42.

The illumination control unit 45 detects an open/close state of the housing of the mobile phone based on an open/close state notification supplied through the open/close detection sensor 18, the open/close detection sensor driver unit 46, and the open/close detection control unit 47. When the housing is opened, the illumination control unit 45 issues an attitude detection cancel request to the event distribution control unit 43 and issues a request for turning OFF LEDs 7 to the LED driver unit 44. In this manner, when the housing is opened, the LEDs 7 are turned OFF.

On the other hand, when the housing is closed, the illumination control unit 45 issues an attitude detection request to the event distribution control unit 43. The illumination control unit 45 issues a request for turning ON the LED 7 to the LED driver unit 44 based on the attitude determination result notified by the event distribution control unit 43. In this manner, when the housing is closed, the LED 7 corresponding to the attitude of the housing is turned ON.

[Advantages of Embodiments]

As is clear from the description given above, a mobile phone according to an embodiment can specify an application program to be activated and information processing to be executed in accordance with a tapped position of a housing and the number of tap operations. In this manner, it is possible to activate a desired application program and specify desired information processing with a small specification gesture, namely, a tap operation.

Light-emission of an LED corresponding to the lowest position of a housing detected by the acceleration sensor 11 from the plurality of LEDs 7 consecutively provided along the perimeter of the upper housing 31 is controlled and the other LEDs are turned OFF. Alternatively, light-emission of the LED 7 corresponding to the lowest position of the housing detected by the acceleration sensor 11 from the plurality of LEDs 7 and of one or more LEDs 7 neighboring this LED 7 is controlled and the other LEDs 7 are turned OFF. Accordingly, light-emission of the LED 7 located at the lowest position (or the LED 7 located at the lowest position and the neighboring LEDs 7 thereof) is controlled in accordance with attitude of the housing.

In this manner, light-emission of the light emitting unit can be controlled in a manner as if the gravity of the Earth affected. Light-emission of the LEDs can be controlled in an original, sophisticated, and visually attractive manner.

When the LED 7 that has been subjected to light-emission control is turned OFF, this LED 7 is turned OFF while gradually lowering luminance as time passes. In this manner, a visual effect like a band of light flows along the perimeter of the housing can be demonstrated. Light-emission of the LEDs 7 can be controlled in an original, sophisticated, and visually attractive manner.

Since all of the LEDs 7 are turned OFF after a predetermined period has passed since the housing is held in a specific position, inconvenience that the LEDs 7 continue to emit light meaninglessly when the mobile phone is in a resting state, such as a state where the mobile phone is placed on a desk, can be prevented. Accordingly, power consumption can be saved.

[Modifications]

Although the present invention is applied to a flip mobile phone in the description of the embodiments given above, the present invention may be applied to stick-type mobile phones and slide-type mobile phones. In either case, advantages similar to the above-described ones can be obtained.

Although the present invention is applied to a mobile phone in the description of the embodiments given above, the present invention may be applied to electronic devices, such as a personal handyphone system (PHS), a personal digital assistant (PDA), a portable video game machine, and a notebook or desktop personal computer. In either case, advantages similar to the above-described ones can be obtained.

The present invention is not limited to the above-described embodiments that have been described as an example. The present invention can be variously modified in accordance with design and so forth within a scope not departing from the technical spirit of the present invention.

The present application contains subject matter related to that disclosed in Japanese Priority Patent Application JP 2008-126540 filed in the Japan Patent Office on May 13, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus within a housing comprising:
    a tap operation detecting unit including a vibration sensor to detect vibrations caused by tapping directly on a housing and representing a tap operation, said tap operation detecting unit configured to detect both (a) the number of tap operations for tapping directly on a position corresponding to upper, lower, left and right parts of the housing, and (b) the tapped position on the housing at which the housing part is tapped;
    a storage unit storing a plurality of application programs;
    an activated application table storing an application program to be activated as determined by both the tapped position part on the housing and the number of tap operations; and
    a control unit configured to recognize an application program corresponding to (i) the tapped position part and (ii) the number of tap operations with reference to the activated application table on the basis of the tapped position part and the number of tap operations detected by the tap operation detecting unit, to read out the recognized application program from the storage unit, and to activate the recognized application program.

2. The apparatus according to claim 1, further comprising:
    a timekeeping unit configured to count time and to output time information; and
    an operation unit configured to receive an operation corresponding to each of the plurality of application programs stored in the storage unit,
    wherein the control unit monitors whether predetermined time has passed since activation of the application program on he basis of the time information supplied from the timekeeping unit, and terminates the activated application program when neither the tap operation of the housing detected by the tap operation detecting unit nor an operation performed on the operation unit is detected within the predetermined time.

3. An information processing apparatus comprising:
a storage unit disposed within a housing for storing a plurality of application programs associated with respective upper, lower, left and right locations on the housing at which a user may tap;
an application activating unit configured to activate a stored application program corresponding to and determined by which one of locations the upper, lower, left and right on the housing that the user taps directly;
a tap operation detecting unit including a vibration sensor to detect vibrations caused by tapping directly on a location of the housing of the apparatus and representing a tap operation, said tap operation detecting unit configured to detect at least the number of tap operations for tapping the housing while the application program corresponding to the tapped location on the housing that is activated by the application activating unit is active;
a corresponding information processing table storing information processing of each of the plurality of application programs as determined by at least the number of tap operations detected by the tap operation detecting unit; and
a control unit configured to detect information processing of the activated application program determined by the number of tap operations with reference to the corresponding information processing table when the tap operation detecting unit detects the number of tap operations while the application program is active and to execute the detected information processing.

4. The apparatus according to claim 3, farther comprising:
a communication unit configured to permit execution of a voice call and/or a video call; and
a reception notifying unit configured to perform predetermined reception notification when the voice call and/or the video call are received through the communication unit,
wherein the storage unit stores a communication program for controlling communication of the voice call and/or the video call through the communication unit as one of the plurality of application programs stored in the storage unit, and
wherein the corresponding information processing table stores processing for stopping the reception notification when the communication program is active in association with the number of tap operations detected by the tap operation detecting unit, and
wherein the control unit activates the communication program when the voice call and/or the video call is received through the communication unit and controls the reception notifying unit to perform the predetermined reception notification, whereas the control unit controls the reception notifying unit to stop the reception notification when the control unit determines, with reference to the corresponding information processing table, that the number of tap operations detected by the tap operation detecting unit while the control unit is controlling the reception notifying unit is equal to a value corresponding to the processing for stopping the reception notification stored in the corresponding information processing table.

5. The apparatus according to claim 3, further comprising:
a communication unit configured to permit execution of mail communication using a mail address as an address of a mail and/or mail communication using a phone number as an address of a mail; and
a reception notifying unit configured to perform predetermined reception notification when one of the mails is received through the communication unit,
wherein the storage unit stores a mail management program for controlling the mail communication through the communication unit as one of the plurality of application programs stored in the storage unit, and
wherein the corresponding information processing table stores processing for stopping the reception notification when the mail management program is active in association with the number of tap operations detected by the tap operation detecting unit, and
wherein the control unit activates the mail management program when the mail is received through the communication unit and controls the reception notifying unit to perform the predetermined reception notification, whereas the control unit controls the reception notifying unit to stop the reception notification when the control unit determines, with reference to the corresponding information processing table, that the number of tap operations detected by the tap operation detecting unit while the control unit is controlling the reception notifying unit is equal to a value corresponding to the processing for stopping the reception notification stored in the corresponding information processing table.

6. The apparatus according to claims 3, further comprising:
a tilt and rotation operation detecting unit configured to detect a tilt operation for tilting the housing and a rotation operation for rotating the housing,
wherein the corresponding information processing table stores information processing of each of the plurality of application programs in association with the tilt operation and the rotation operation detected by the tilt and rotation operation detecting unit, and
wherein the control unit detects information processing of the activated application program corresponding to the tilt operation or the rotation operation with reference to the corresponding information processing table when the tilt and rotation operation detecting unit detects the tilt operation or the rotation operation, and executes the detected information processing.

7. The apparatus according to claim 3,
wherein the control unit terminates the information processing based on the number of tap operations, the tilt operation, or the rotation operation when the tap operation detecting unit detects a predetermined number of tap operations while the application program is active, whereas the control unit restarts information processing based on the number of tap operations, the tilt operation, or he rotation operation when the tap operation detecting unit detects a predetermined number of tap operation while the information processing is stopped.

8. An information processing method comprising the steps of:
causing a vibration sensor to detect vibrations caused by tapping directly on a position of a housing having upper, lower, left and right parts and representing a tap operation;
causing a tap operation detecting unit to detect both (a) the number of tap operations for tapping directly on the housing, and (b) the tapped position of the housing at which the housing is tapped;
causing a control unit to recognize, as a function of (i) the part of the housing that is tapped and (ii) the number of tap operations, an application program corresponding to the tapped position and the number of tap operations from a plurality of application programs stored in a storage unit with reference to an activated application table that stores an application program to be activated on the basis of both the tapped position on the housing and the number of tap operations; and causing the control unit to read out the recognized application program from the storage unit and to activate the application program.

9. An information processing method comprising the steps of causing a stored one of plural application programs to be activated corresponding to and determined by which one of the upper, lower, left and right locations on a housing that is tapped directly by a user;

causing a vibration sensor to detect vibrations caused by tapping directly on the housing and representing a tap operation;

causing a tap operation detecting unit to detect at least the number of times the user taps the housing while the activated application program is active;

causing a control unit to detect, when the number of tap operations is detected while the application program corresponding to the tapped location on the housing is active, information processing of the activated application program determined by the number of tap operations with reference to a corresponding information processing table that stores information processing of each of the plurality of application programs as determined by at least the number of tap operations; and causing the control unit to execute the detected information processing.

10. A non-transitory computer readable record medium on which is stored an information processing program that, when executed by a processor, performs the steps of;

causing the processor to function as a to operation detection control unit that controls a tap operation detecting unit to detect both (a) the number of tap operations for tapping directly on a housing sensed by a vibration sensor that detects vibrations caused by tapping directly on a position of the housing and (b) an upper, lower, left and right position of the housing at which the housing is tapped;

causing the processor to function as a corresponding application detecting unit for recognizing, as a function of (i) the part of the housing that is tapped and (ii) number of tap operations detected, a respective one of plural stored application program corresponding to the tapped part and the number of tap operations with reference to an activated application table that stores an application program to be activated on the basis of both the tapped part on the housing and the number of tap operations; and causing the processor to function as a control unit for reading out said one stored application program and for activating the application program.

11. A non-transitory computer readable record medium on which is stored an information processing program that, when executed by a processor, performs the steps of:

causing the processor to function as an application activating unit for activating a stored one of plural application programs corresponding to and determined by which one of the upper, lower, left and right locations on a housing that is tapped directly by a user;

causing the processor to function as a tap operation detection control unit to detect at least the number of times the user taps on the housing sensed by a vibration sensor that detects vibrations caused by tapping directly on the housing while the stored application program is active;

causing the processor to function as a corresponding application detecting unit for detecting, when the number of tap operations is detected while the application program corresponding to the tapped location on the housing is active, information processing of the activated application program determined by the number of tap operations with reference to a corresponding information processing table that stores information processing of each of the plurality of application programs as determined by at least the number of tap operations; and causing the processor to function as a control unit for reading out the stored application program and for activating the read out application program.

12. A mobile terminal comprising:

a tap operation detecting unit including a vibration sensor to detect vibrations caused by tapping directly on a position of a housing of the mobile terminal and representing a tap operation, said tap operation detecting unit configured to detect both (a) the number of tap operations for tapping directly on a position corresponding to upper, lower, left and right parts of the housing, and (b) the tapped position on the housing at which the housing part is tapped;

a storage unit storing a plurality of application programs;

an activated application table storing an application program to be activated as determined by both the tapped position part on the housing and the number of tap operations; and a control unit configured to recognize an application program corresponding to (i) the tapped position part and (ii) the number of tap operations with reference to the activated application table on the basis of the tapped position part and the number of tap operations detected by the tap operation detecting unit, to read out the recognized application program from the storage unit, and to activate the recognized application program.

13. A mobile terminal comprising:

a storage unit disposed within a housing of the mobile terminal for storing a plurality of application programs associated with respective upper, lower, left and right locations on the housing at which a user may tap;

an application activating unit configured to activate, a stored application program corresponding to and determined by which one the upper, lower, left and right locations on the housing that the user taps directly;

a tap operation detecting unit including a vibration sensor to detect vibrations caused by tapping directly on a location of the housing of the mobile terminal and representing a tap operation, said tap operation detecting unit configured to detect at least the number of tap operations for tapping the housing while the application program corresponding to the tapped location on the housing that is activated by the application activating unit is active;

a corresponding information processing table storing information processing of each of the plurality of application programs as determined by at least the number of tap operations detected by the tap operation detecting unit; and a control unit configured to detect information processing of the activated application program determined by the number of tap operations with reference to the corresponding information processing table when the tap operation detecting unit detects the number of tap operations while the application program is active and to execute the detected information processing.

* * * * *